Dec. 11, 1928.
F. W. BEIDATSCH
WEEDLESS FISH BAIT
Filed July 18, 1927
1,694,697
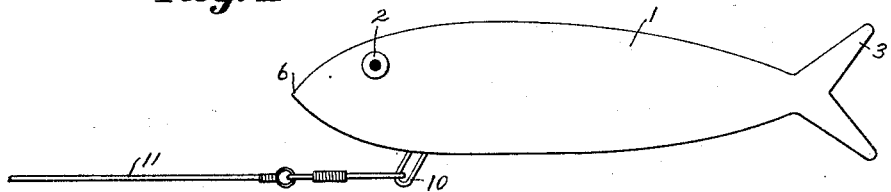
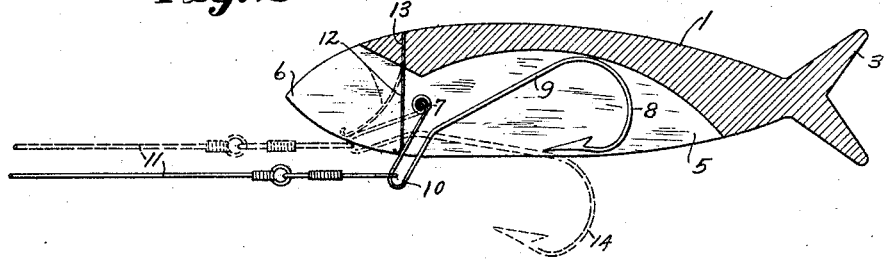
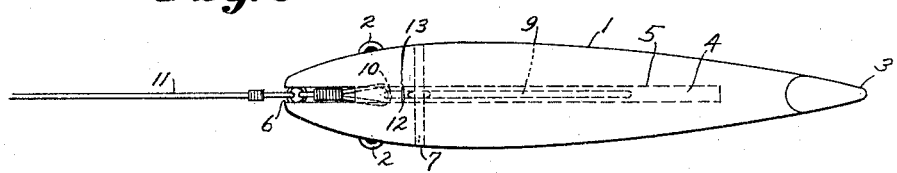
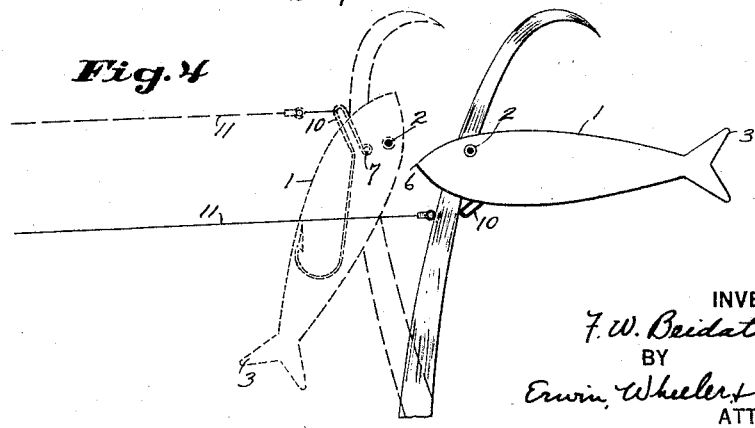
INVENTOR
F. W. Beidatsch
BY
Erwin, Wheeler & Woolard
ATTORNEYS Patented Dec. 11, 1928.

1,694,697

UNITED STATES PATENT OFFICE.

FRED W. BEIDATSCH, OF MILWAUKEE, WISCONSIN.

WEEDLESS FISH BAIT.

Application filed July 18, 1927. Serial No. 206,459.

My invention relates to improvements in weedless fish bait.

Most weedless minnows or other bait for catching game fish are designed to be set for automatic release when the bait is struck and reliance in most cases is based upon the smooth formation of the set bait to avoid catching upon weeds and other obstructions, but the resulting mechanical infirmities of such devices have made them unreliable and unsatisfactory.

It is the object of my invention, therefore, to provide a weedless fish bait wherein the body normally conceals the fish hook or hooks but in which the hook is adapted to be thrust forward by the pull exerted by the fish to be caught rather than by mechanical features embodied within the structure of the bait.

It is a further object of my invention to provide a fish bait which will automatically throw off or evade weeds with which it is brought in contact.

In the drawings:—

Figure 1 is a side view of my fish bait in the position which it assumes when it is drawn through the water.

Figure 2 is a longitudinal vertical section through Figure 1.

Figure 3 is a vertical view of my bait.

Figure 4 is a view descriptive of the manner in which my bait throws off weeds which are caught between it and its leader.

Like parts are identified by similar reference characters throughout the several views.

The body of the fish 1 is provided with the usual eyes 2 and simulated tail 3 to imitate generally the body of a minnow. In the ventral side of the body extending along a median line 4 longitudinally disposed through the body of the minnow and preferably only at the anterior portion of the body, I have provided a slot 5 which extends through the extreme front 6 of the body of the bait and provides a receptacle within which the mechanical features of my weedless bait are disposed. At a point well forward in reference to the slotted portion of the body and transversely disposed through the body, I have provided a pivot pin 7 upon which is mounted a fish hook 8 which is formed as best shown in Figure 2.

The shape and position of this hook is of extreme importance in carrying out the principle which I have used in devising my weedless bait. Extending downwardly and slightly forwardly from the pivot pin, the shank 9 of the fish hook is formed in a loop 10 to which a leader 11 may be secured. Normally this loop 10 is the only portion of the bait mechanism extending beyond the margins of the body 1 with the result that as the bait is drawn through the water the only projection upon which weeds may become lodged is the loop 10 located upon the ventral side of the body. If weeds have become lodged at that position, the pull of the leader against the weeds and therefore against the forward point or portion 6 of the body will pivot the entire body about the axis of the loop 10 with the result that the body will assume the position shown in Figure 4 so as to enable the weeds to be washed from their point of lodgement against the loop 10.

It will be noted that when the minnow assumes the position indicated in Figure 4 and as the minnow swings to this position, the axis of the pivot pin 7, of the loop 10 and of the leader 11 assumes a position within a straight line and the hook 8 is not therefore caused to be withdrawn from within the body 1 of the minnow and during the entire assumption of the position of the minnow shown in Figure 4, the hook is retained within the body and not forced into a projecting point for picking up weeds or other obstructions.

In the normal use of the minnow in unobstructed water, the position of the hook 8 as shown in Figure 2 is maintained by the pressure of a spring 12 which may be inserted and wedged within a small aperture at 13 in the body of the bait.

When the bait is "struck" by a fish, the initial impact will cause a resistance to the pull of the leader 11 upon the loop 10 and will immediately cause the hook to be thrust downwardly from the body of the bait to engage with the mouth of the fish as shown in dotted lines at 14 in Figure 2, and the hook will then perform the usual function of a fish hook in retaining its position within the tissues of the fish's mouth.

Normally it is advisable to so weight the body of my bait as to cause it to ride in the water as shown in the drawings thereby causing the hook to strike downwardly into the softer tissue of the mouth of the fish, but it is obviously possible to weight the body to ride with the leader loop 10 in an upwardly directed position thereby causing the hook to strike upwardly if the occasion demands.

It will thus be seen that without complicated mechanical contrivances I have provided a weedless fish hook which will successfully operate in weedy waters and will automatically throw off weeds and other impeding substances as fast as they are accumulated. The function of the fish hook, normally entirely concealed within the body of the bait, being unimpaired by its position as indicated.

I claim:

1. A device of the character described, comprising a body provided with a longitudinally disposed slot and a fish hook pivotally mounted within the slot and provided with a shank having a curved portion protruding from the slot to form an attachment for a leader.

2. A weedless bait comprising a minnow body, a hook pivotally mounted within the body, and a loop in said hook whereby a leader attached thereto will expel the hook from the body of the minnow upon imposition of stress between the body of the minnow and said leader.

3. In a device of the character described, a body adapted to be propelled by a leader and provided with a slot, a pivot pin traversing the slot, a fish hook provided with a curved shank and mounted on said pivot pin whereby to dispose the curve of said shank eccentric to said pivot and to the axis of said body for attachment to a leader.

4. A weedless minnow comprising a body, a hook provided with a pivot, and normally positioned within the body, a spring for holding said hook in normal position and a leader secured to said hook adjacent said pivot at a point such that the retarded movement of the minnow against the pull of the leader may cause the hook to pivotally emerge from the body of the minnow.

5. In a device of the character described, a body, a longitudinal slot through said body, a pivot pin through said body and traversing said slot, a fish hook pivotally disposed upon said pivot pin and adapted to normal position within the slot, a U-shaped shank for said hook whereby to secure said bait to a line, a spring for yieldably retaining the hook in normal position whereby a pull upon the shank may cause the hook to protrude from said body.

6. A minnow including a slotted body, a hook mounted upon a pivot ahead of the center of gravity of the body and within the slot, a shank for the hook provided with a U-shaped portion extending without the body of the minnow and forwardly of the center of gravity thereof, and a leader attached to the U-shaped shank.

7. A minnow including a slotted body, a hook mounted upon a pivot ahead of the center of gravity of the body and within the slot, a shank for the hook provided with a U-shaped portion extending without the body of the minnow and forwardly of the center of gravity thereof, a spring pressing upon the shank of the hook to normally position the hook within the slot, and a leader attached to the U-shaped shank.

8. A minnow including a slotted body, a hook mounted upon a pivot ahead of the center of gravity of the body and within the slot, a shank for the hook provided with a U-shaped portion extending without the body of the minnow and forwardly of the center of gravity thereof, a spring pressing upon the U-shaped portion of the shank to normally yieldably position the hook within the slot, and a leader attached to the U-shaped shank.

F. W. BEIDATSCH.